(12) United States Patent
Wright et al.

(10) Patent No.: US 8,894,158 B2
(45) Date of Patent: Nov. 25, 2014

(54) UNITIZED BRAKE ASSEMBLY

(75) Inventors: Eric C. Wright, Evans Mills, NY (US);
Dan Rowland, Adams Center, NY (US)

(73) Assignee: New York Air Break Corporation, Watertown, NY (US)

( * ) Notice: Subject to any disclaimer, the term of this patent is extended or adjusted under 35 U.S.C. 154(b) by 733 days.

(21) Appl. No.: 12/338,059

(22) Filed: Dec. 18, 2008

(65) Prior Publication Data

US 2009/0167075 A1   Jul. 2, 2009

Related U.S. Application Data

(60) Provisional application No. 61/006,137, filed on Dec. 26, 2007.

(51) Int. Cl.
*B60T 8/18* (2006.01)

(52) U.S. Cl.
USPC ......................................... 303/22.2; 303/22.6

(58) Field of Classification Search
CPC ... B60T 8/1893; B60T 17/228; B60T 13/665; B60T 8/185
USPC .......... 303/8, 9.75, 22.6–22.8, DIG. 10, 22.2, 303/90; 188/153 R, 195
See application file for complete search history.

(56) References Cited

U.S. PATENT DOCUMENTS 4,776,648 A * 10/1988 Newton et al. ................ 303/22.5
6,776,268 B2 * 8/2004 Hart .......................... 188/153 R
7,306,078 B2 * 12/2007 Fish .............................. 188/166

* cited by examiner

*Primary Examiner* — Xuan Lan Nguyen
(74) *Attorney, Agent, or Firm* — David L. Nocilly; Bond Schoeneck & King, PLLC

(57) ABSTRACT

The present disclosure relates to brake control systems for the control of air brakes on rail vehicles. More particularly, the present disclosure relates to a unitized brake assembly including a pipe bracket coupled to a combined brake cylinder-empty/load reservoir and a control valve mounted on the pipe bracket.

20 Claims, 5 Drawing Sheets

UNITIZED BRAKE ASSEMBLY

This application claims priority under 35 U.S.C. §119(e) to U.S. Provisional Application Ser. No. 61/006,137, filed Dec. 26, 2007, which is expressly incorporated by reference herein.

BACKGROUND

The present disclosure relates to brake control systems for the control of air brakes on rail vehicles. More particularly, the present disclosure relates to a unitized brake assembly including a pipe bracket coupled to a brake cylinder and a control valve mounted on the pipe bracket.

In a "single-sided" type pipe bracket and control valve arrangement, it is known to mount an emergency and a service portion of a control valve to a common or front face of a pipe bracket and have ports for the brake cylinder, brake pipe and reservoirs on the opposing or back face of the pipe bracket, as noted in U.S. Pat. No. 5,478,142. A retainer valve is mounted to the front face of the pipe bracket between the service and emergency portions and a cut-off cock is mounted to the brake pipe port on the back face. The pipe bracket is mounted to the rail vehicle by cantilevered flanges.

Each of the various known mounting options requires a great deal of piping between the pipe bracket and, for example, the brake cylinder, empty/load device and auxiliary and emergency reservoirs. The combination of the mountings on the pipe bracket and the piping requirements make for a crowded or cramped arrangement for maintenance and operations purposes. Moreover, mounting of the components and connection of all the piping leads to excessive labor and parts inventory costs.

It is known, for example, from U.S. Pat. No. 4,058,348 to mount a control valve and a brake cylinder to a pipe bracket and to have this unitized assembly mounted to a rail vehicle using bolts to mount both the pipe bracket and the brake cylinder to the rail vehicle. The unitized assembly disclosed does not provide a provision for an empty/load device.

It is also known, for example, from U.S. Pat. No. 4,498,712, to connect a separate empty/load device to a brake cylinder-control valve arrangement via piping connections.

SUMMARY

In accordance with the present disclosure, a unitized brake assembly for operating the brakes on a rail vehicle comprises a pipe bracket including at least a brake cylinder port, a brake pipe port, a reservoir port and control valve ports. The unitized brake assembly also includes a control valve mounted on the pipe bracket and further includes a plurality of ports mated with the control valve ports on the pipe bracket.

In an illustrative embodiment, the unitized brake assembly includes a combined brake cylinder-empty/load reservoir having a plurality of ports and also including at least one mounting flange configured to mount the unitized brake assembly directly to the rail vehicle.

In this illustrative embodiment, the unitized brake assembly includes the pipe bracket mounted on and supported by the combined brake cylinder-empty/load reservoir with the brake cylinder port of the pipe bracket mating with the brake cylinder port of the combined brake cylinder-empty/load reservoir and the empty/load reservoir port of the pipe bracket mating with the empty/load reservoir port of the combined brake cylinder-empty/load reservoir. And, the brake cylinder-empty/load reservoir mounting flange is the only mounting of the unitized brake assembly to the rail vehicle.

In another illustrative embodiment, the unitized brake assembly includes a pipe bracket including at least a brake cylinder port, a brake pipe port, a reservoir port, control valve ports and empty/load ports. A control valve is mounted to the pipe bracket and includes a plurality of ports mated with the control valve ports on the pipe bracket. A combined brake cylinder-empty/load reservoir is mounted to the pipe bracket and includes a brake cylinder port mated with the brake cylinder port on the pipe bracket and an empty/load reservoir port mated with a reservoir port on the pipe bracket. An empty/load device is mounted to the pipe bracket and includes a plurality of ports mated with the empty/load ports on the pipe bracket.

In the illustrative embodiments of the unitized brake assembly, the coupling of components, such as the empty/load device, the control valve and the brake cylinder directly to the pipe bracket, may be provided by a sealable port or other connection between surfaces of the pipe bracket and surfaces of the components, thereby eliminating the need for piping connections between the pipe bracket and the components. In the illustrative embodiments of the unitized brake assembly, the unitized brake assembly may also include additional components such as a retainer valve mounted to the pipe bracket via a sealable port connection between surfaces of the pipe bracket and the retainer valve.

Other aspects of the present disclosure will become apparent from the following descriptions when considered in conjunction with the accompanying drawings.

BRIEF DESCRIPTION OF THE DRAWINGS

The detailed description particularly refers to the accompanying figures.

DETAILED DESCRIPTION

Figure 1:
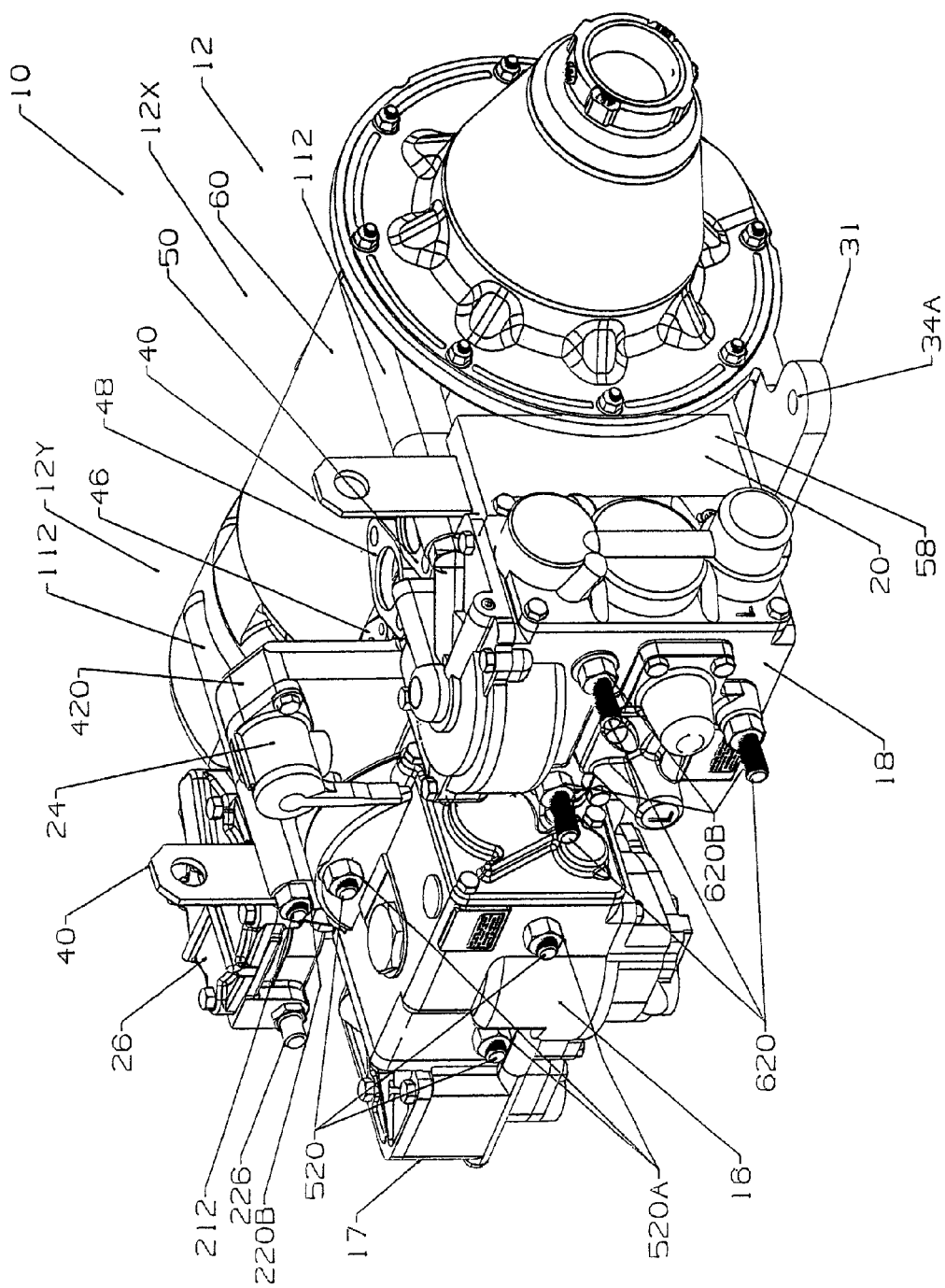
FIG. 1 is a perspective view of a unitized brake assembly, in accordance with the present disclosure.

It is within the scope of the present disclosure that a unitized brake assembly 10 includes components such as a combined brake cylinder-empty/load reservoir 12, a control valve 14, and a pipe bracket 20, and may include one or more additional components such as a retainer valve 24 and an empty/load proportioning valve 26. The unitized brake assembly 10 is configured such that the included components are packaged on a framework as an integrated unit including direct coupling via sealable fluid connections between one or more surfaces of the pipe bracket 20 and the surfaces of the combined brake cylinder-empty/load reservoir 12, control valve 14, empty/load proportioning valve 26, and retainer valve 24. A piping connection exists between a combined auxiliary/emergency reservoir and the pipe bracket 20 and a brake pipe connection to the pipe bracket 20.

Such a unitized brake assembly 10 is designed to provide a pre-assembled, pre-tested brake assembly to the customer or rail vehicle builder. Elimination of piping connections between, for example, components such as the pipe bracket 20 and the combined brake cylinder-empty/load reservoir 12, the empty/load proportioning valve 26, and the retainer valve 24 reduces the potential for fluid leakage from piping connections. And, co-location of all brake equipment on the rail vehicle would provide for easier maintenance and service operations.

A unitized brake assembly 10 is shown in FIGS. 1-5. Unitized brake assembly 10 comprises the combined brake cylinder-empty/load reservoir 12, pipe bracket 20 and the control valve 14 mounted on opposite sides or faces or surfaces of and coupled directly to pipe bracket 20. The brake cylinder portion of the combined brake cylinder-empty/load reservoir 12 is identified as 12X and the empty/load reservoir portion is identified as 12Y. Brake cylinder 12X and empty/load reservoir 12Y may be formed integrally, monolithically or otherwise combined to form the combined brake cylinder-empty/load reservoir 12.

Pipe bracket 20 is configured as a single-sided pipe bracket, in that the control valve 14 is mounted on only one side or surface of pipe bracket 20. Control valve 14 includes a service portion 16 with manual release valve 17 and an emergency portion 18 mounted to matching ports on a front surface 22 of pipe bracket 20, as suggested in FIGS. 1, 2, 4 and 5. Service portion 16 is mounted to pipe bracket 20 via bolts 520 extending from pipe bracket 20 and via nuts 520A.

Manual release valve 17 is mounted to service portion 16 via bolts 17A. Emergency portion 18 is mounted to pipe bracket 20 via bolts 620 extending from pipe bracket 20, mounting holes 620A on emergency portion 18 and nuts 620B.

Unitized brake assembly 10 also includes a retainer valve 24 mounted to pipe bracket 20 via bolts 124 and threaded openings 320A on integral extension 320 extending upwardly from top surface 52 and being flush with front surface 22 of pipe bracket 20. Retainer valve 24 mates with pipe bracket 20 via sealable port 224 on retainer valve 24 and sealable port 420 on extension 320 of pipe bracket 20.

Combined brake cylinder-empty/load reservoir 12 includes sealable ports 13 and 13A configured to mate with sealable ports 21 and 21A, respectively, on pipe bracket 20 using O-rings 23 and 29, respectively, therebetween.

Unitized brake assembly 10 further includes an empty/load proportioning valve 26 mounted to pipe bracket 20 via bolts 126 and threaded openings 128 on a left surface 28 of pipe bracket 20. Empty/load valve 26 mates with pipe bracket 20 via three sealable ports 120, 121 and 122 on pipe bracket 20 connecting the empty/load valve to the brake cylinder 12X, empty/load reservoir 12Y and control valve 14. Empty/load valve 26 also includes sealable port 226 configured to function as an empty/load sensing port.

Mounting of an empty/load device on a face of a pipe bracket, which pipe bracket is different from a pipe bracket to which a control valve is mounted, is known in the rail industry. However, as disclosed herein, integrating the empty/load reservoir 12Y with brake cylinder 12X to form combined brake cylinder-empty/load reservoir 12 and mating it to pipe bracket 20 via sealable ports 13, 13A, 21 and 21A is an innovative variation of and improvement from what is known.

Figure 4:
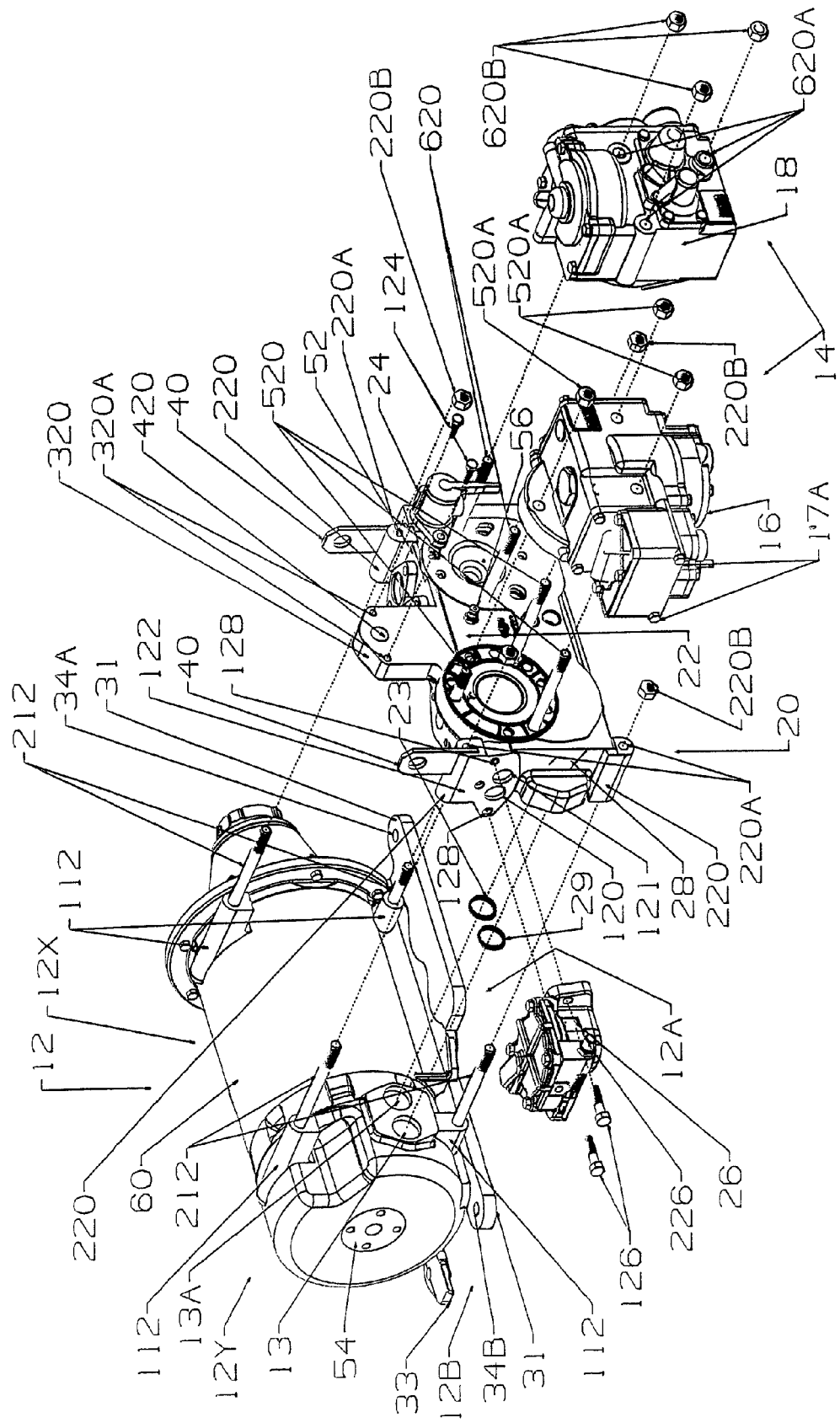
FIG. 4 is an exploded view of the unitized brake assembly of FIG. 1.
Figure 5:
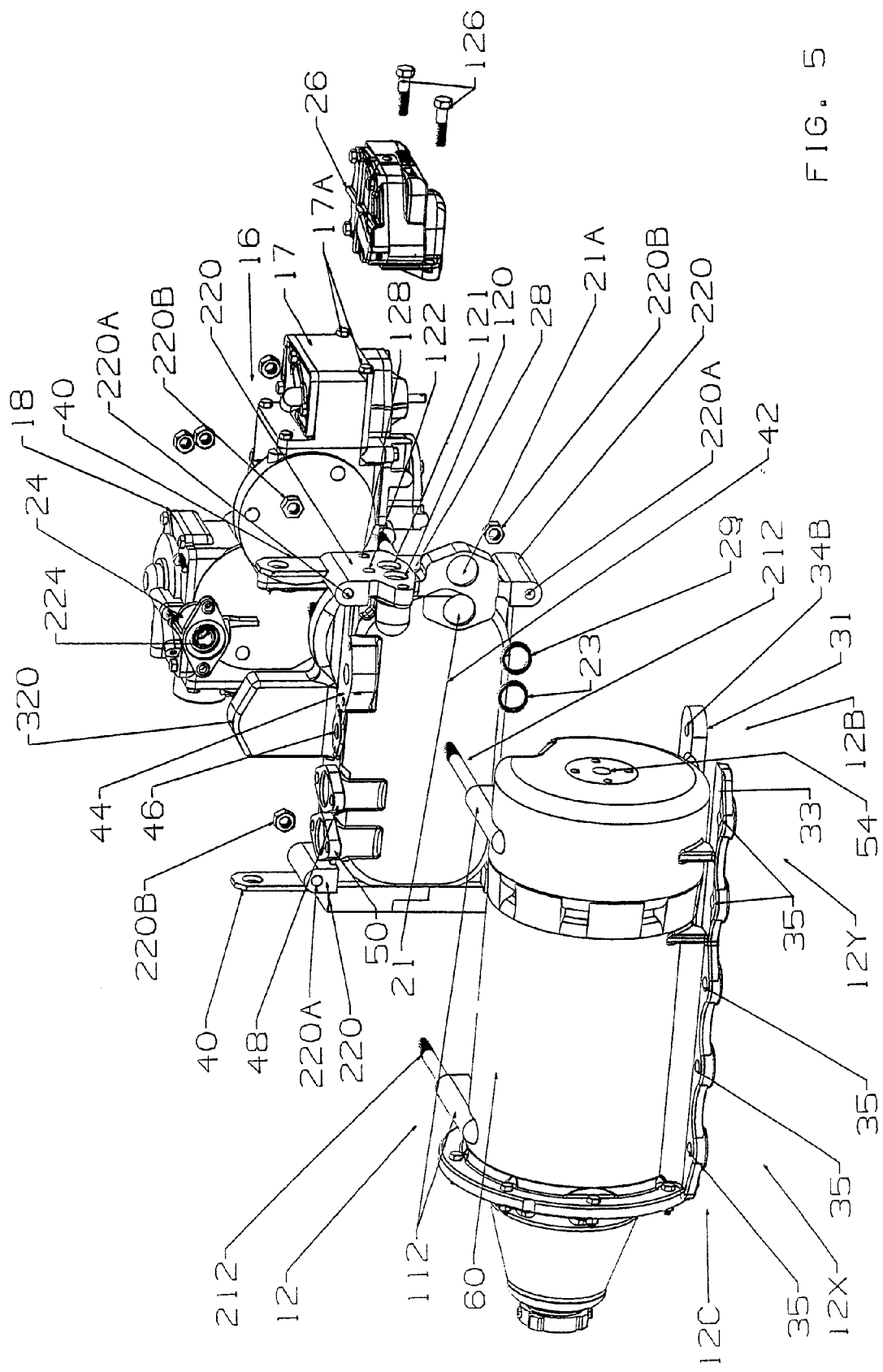
FIG. 5 is another exploded view seen from the rear of the unitized brake assembly of FIG. 1.

Pipe bracket 20 is mounted on combined brake cylinder-empty/load reservoir 12 via bolts 212 extending from a first set of brackets 112, as shown in FIGS. 4 and 5. Bolts 212 are inserted into and through mounting holes 220A on a second set of brackets 220, which second set of brackets 220 are coupled to or integrally or monolithically formed with and extend from pipe bracket 20 and face toward combined brake cylinder-empty/load reservoir 12. Bolts 212 are secured by nuts 220B.

Figure 2:
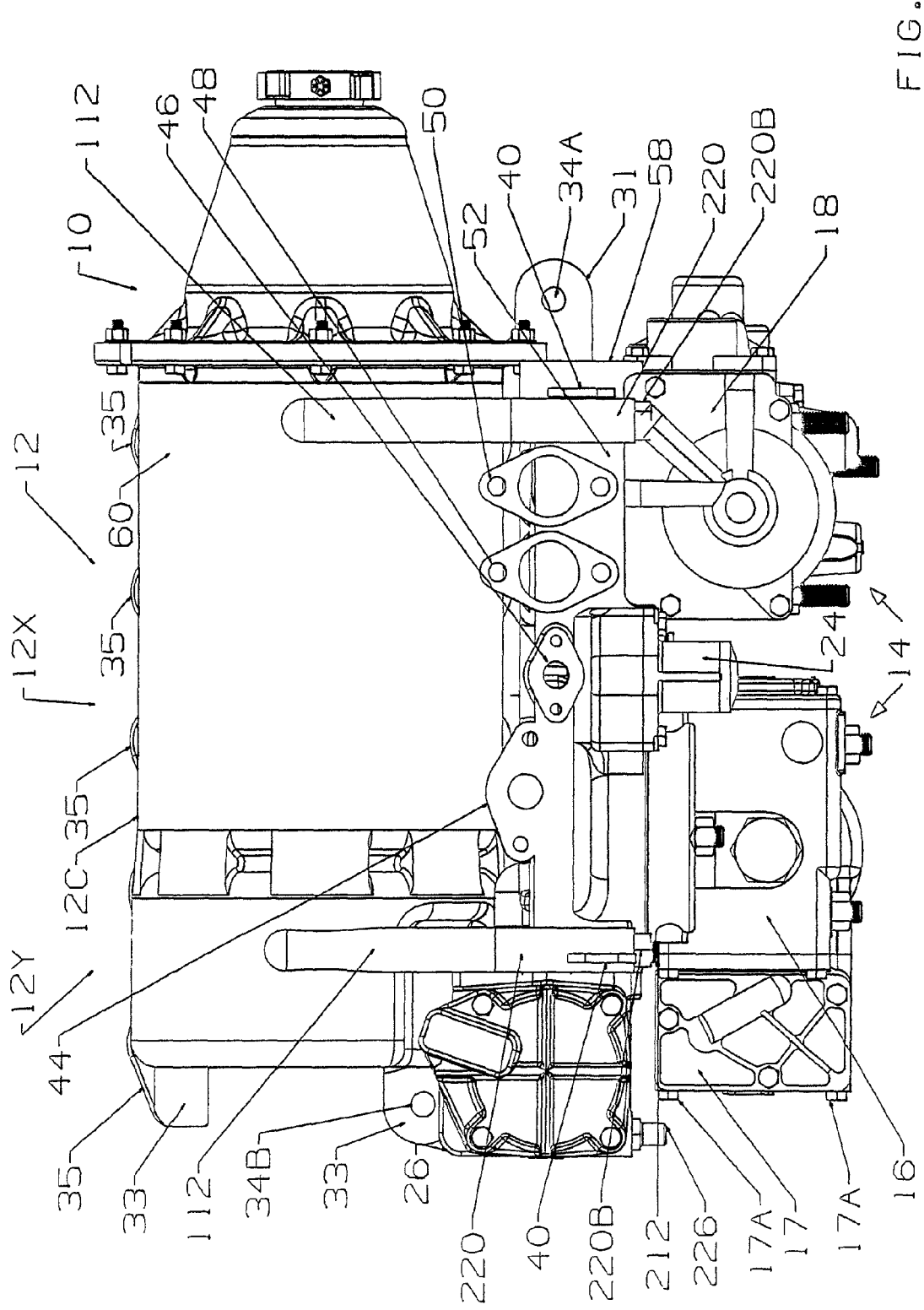
FIG. 2 is a top view of the unitized brake assembly of FIG. 1.

Combined brake cylinder-empty/load reservoir 12 includes a rail vehicle mounting foot or flange 31 extending from a longitudinal side 12A of combined brake cylinder-empty/load reservoir 12 facing towards a rear surface 42 of pipe bracket 20, as shown in FIGS. 2 and 4. Mounting flange 31 extends outwardly from an end 12B of combined brake cylinder-empty/load reservoir 12 and from a right surface 58 of pipe bracket 20. Mounting flange 31 includes rail vehicle mounting holes 34A and 34B to couple combined brake cylinder-empty/load reservoir 12 to the rail vehicle.

Figure 3:
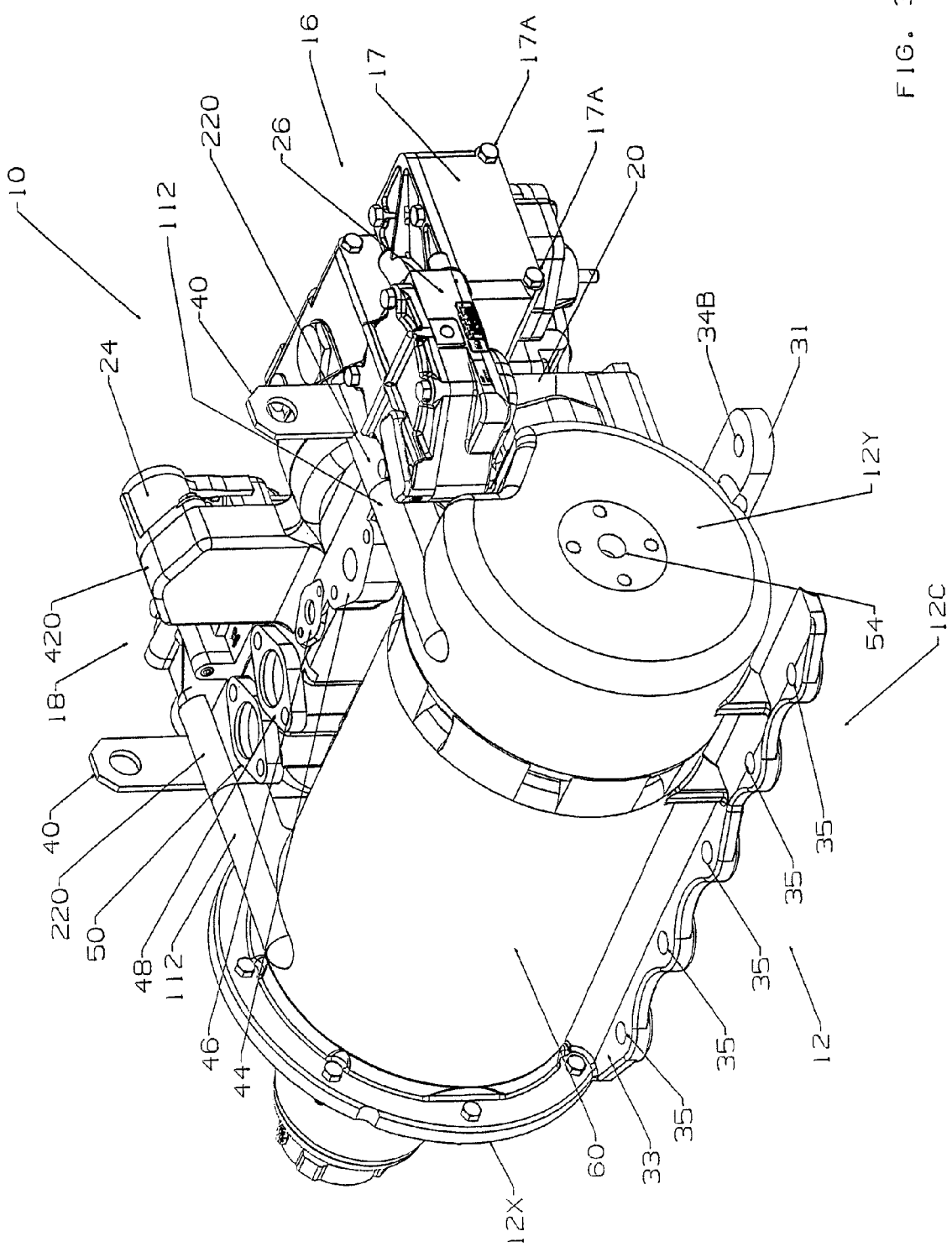
FIG. 3 is another perspective view of the unitized brake assembly of FIG. 1.

Combined brake cylinder-empty/load reservoir 12 further includes another rail vehicle mounting foot or flange 33 extending outwardly from an opposite longitudinal side 12C and from end 12B of combined brake cylinder-empty/load reservoir 12, as shown in FIGS. 3, 4 and 5. Mounting flange 33 includes rail vehicle mounting holes 35 to couple combined brake cylinder-empty/load reservoir 12 to the rail vehicle, as shown in FIGS. 2, 3 and 5.

Mounting flanges 31 and 33 extend past end 12B for stability and mounting holes 34A and 34B are offset or displaced from one another to provide access for installation and/or maintenance, as shown in FIGS. 2, 4 and 5. Mounting holes 34A, 34B and 35 are located outside a center of gravity of the mounted control valve 14. However, the center of gravity of unitized brake assembly 10 is located between the mounting holes 34A and 34B for stability. The mounting of the combined brake cylinder-empty/load reservoir 12 to the rail vehicle is accomplished via bolts (not shown) extending through mounting holes 34A, 34B and 35.

The mounting of the pipe bracket 20 on the combined brake cylinder-empty/load reservoir 12 via bolts 212, brackets 220 and nuts 220B makes for rigid connections in order to reduce vibrations that may be transmitted from the rail vehicle to the service and emergency portions 16, 18, of control valve 14, (which may be constructed of aluminium) and to the retainer valve 24 (which may be made of plastic). Vibrations are also reduced because the combined brake cylinder-empty/load reservoir 12 is made of or includes cast iron which has natural vibration damping properties. These rigid connections help to protect vibration-susceptible components.

As noted, pipe bracket 20 is connected to combined brake cylinder-empty/load reservoir 12 by four connections via bolts 212. The combined brake cylinder-empty/load reservoir 12 is connected to the rail vehicle by a plurality of bolts (not shown) via mounting flanges 31 and 33 and mounting holes 34A, 34B and 35. Previously in the art, the pipe bracket 20 was connected by brackets to the rail vehicle. The present disclosure provides for a different footprint and for a more stable connection.

The fluid connection between combined brake cylinder-empty/load reservoir 12 and pipe bracket 20 is provided via a sealable ports 13, 13A, 21 and 21A via O-rings 23 and 29, as shown in FIGS. 4 and 5, thereby eliminating a need for a piping connection between pipe bracket 20 and combined brake cylinder-empty/load reservoir 12.

The coupling or fluid connection between retainer valve 24 and pipe bracket 20 is provided via a sealable port 420 on extension 320 of pipe bracket 20 and a sealable port 224 on retainer valve 24, as suggested and shown in FIGS. 4 and 5.

The fluid connection between combined brake cylinder-empty/load reservoir 12 and pipe bracket 20 via sealable ports 13, 13A, 21 and 21A eliminates a need for a piping connection between the empty/load proportioning valve 26 and the empty/load reservoir 12Y in that the empty/load reservoir 12Y would normally be connected to the empty/load proportioning valve 26 and not to the pipe bracket 20.

The fluid connection between the empty/load proportioning valve 26 and the pipe bracket 20 is provided via the three sealable ports 120, 121, 122 on pipe bracket 20, as shown in FIGS. 4 and 5, and corresponding sealable ports (not shown) on empty/load valve 26, thereby eliminating a need for a piping connection between pipe bracket 20 and empty/load valve 26. The three sealable ports 120, 121 and 122 are for the brake cylinder 12X, control valve 14, and empty/load reservoir 12Y. An example of the ports and their relationship, as well as an example of a combined load sensing and proportioning valve, are shown in U.S. Pat. No. 6,206,483. The empty/load proportioning valve 26 include a means (not shown) to proportion fluid to brake cylinder 12X via the pipe bracket 20 as a function of the load of the rail vehicle. Two connections of a separate empty/load sensor (not shown) may be connected at port 46 on pipe bracket 20 for the brake cylinder connection and at port 54 on the empty/load reservoir 12Y for the empty/load reservoir connection, as shown in FIGS. 1, 2 and 4. An example of the separate proportioning valve and load sensor is shown in U.S. Pat. No. 6,666,528.

The pipe bracket 20 includes a plurality of pipe flange connectors 44, 46, 48, 50, shown, for example, on top surface 52 (see FIG. 2), to allow for installation of selected piping connections. Pipe flange connectors 44, 46, 48 and 50, and possibly additional pipe flange connectors on other surfaces of the pipe bracket 20 (not shown), are configured to receive fluid piping connections from one or more of a brake pipe, an auxiliary reservoir, and an emergency reservoir (not shown), and the empty/load sensor. The emergency and auxiliary reservoirs may be combined in a two-compartment reservoir having separate auxiliary and emergency piping connections for connection to the pipe bracket 20.

Thus, for example, the pipe flange connector 44 is for the brake pipe via cutoff-valve and dirt collector. The connector 46 is for the empty/load sensor (not shown). The connector 48 is for the auxiliary reservoir and the connector 50 is for the emergency reservoir. Pipe bracket 20 may also include lifting provisions 40, as shown, for example, in FIGS. 1, 3, 4 and 5, for ease of movement and/or installation of the unitized brake assembly 10. Pipe bracket 20 may also include a brake cylinder pressure tap or test port 56 mounted, for example, on front surface 22, as shown, for example, in FIG. 4.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A unitized brake assembly for operating the brakes on a rail vehicle, comprising:
    a pipe bracket including at least a brake cylinder port, a brake pipe port, a reservoir port, and control valve ports;
    a control valve mounted on the pipe bracket and having a plurality of ports mated with the control valve ports on the pipe bracket;
    an empty/load device mounted to the pipe bracket;
    a combined brake cylinder-empty/load reservoir having ports and having at least one mounting flange configured to mount the unitized brake assembly directly to the rail vehicle; and
    the pipe bracket being mounted on and supported by the combined brake cylinder-empty/load reservoir, the brake cylinder port of the pipe bracket mating with a first of the ports of the combined brake cylinder-empty/load reservoir, and the at least one mounting flange being the only mounting of the unitized brake assembly to the rail vehicle.

2. The unitized brake assembly of claim 1, wherein the at least one mounting flange is located on a longitudinal side of the combined brake cylinder-empty/load reservoir facing a rear side of the mounted pipe bracket.

3. The unitized brake assembly of claim 1, wherein the at least one mounting flange is located on a longitudinal side of the combined brake cylinder-empty/load reservoir opposite from a longitudinal side of the combined brake cylinder-empty/load reservoir that faces a rear side of the mounted pipe bracket.

4. The unitized brake assembly of claim 1, wherein the at least one mounting flange includes two mounting flanges and each flange is mounted on a different, opposite longitudinal side of the combined brake cylinder-empty/load reservoir.

5. The unitized brake assembly of claim 2, wherein the at least one mounting flange extends outwardly from an end of the combined brake cylinder-empty/load reservoir and beyond an end surface of the mounted pipe bracket.

6. The unitized brake assembly of claim 3, wherein the at least one mounting flange extends outwardly from an end of the combined brake cylinder-empty/load reservoir and beyond an end surface of the mounted pipe bracket.

7. The unitized brake assembly of claim 4, wherein each of the mounting flanges extends outwardly from an end of the combined brake cylinder-empty/load reservoir and beyond an end surface of the mounted pipe bracket.

8. The unitized brake assembly of claim 4, wherein each of the mounting flanges include mounting holes to couple the combined brake cylinder-empty/load reservoir to the rail vehicle and the mounting holes are located outside a center of gravity of the mounted control valve.

9. The unitized brake assembly of claim 4, wherein at least one of the mounting flanges includes two mounting holes offset and displaced from one another, and a center of gravity of the unitized brake assembly is located between the two mounting holes.

10. The unitized brake assembly of claim 1, wherein the pipe bracket is mounted on the combined brake cylinder-empty/load reservoir via bolts extending from a first set of brackets on the combined brake cylinder-empty/load reservoir, which bolts are inserted into and through holes on a second set of brackets on the pipe bracket and secured via nuts, such mounting creating a rigid connection to reduce vibrations transmitted from the rail vehicle to the control valve during an operation of the rail vehicle.

11. The unitized brake assembly of claim 1, wherein the mating of the brake cylinder port of the pipe bracket with the first of the ports of the combined brake cylinder-empty/load reservoir is a mating whereby both ports are sealable ports and no piping connections exist between the pipe bracket and the combined brake cylinder-empty/load reservoir.

12. The unitized brake assembly of claim 2, wherein the mounted pipe bracket at least partially overlies the at least one mounting flange.

13. The unitized brake assembly of claim 1, wherein the combined brake cylinder-empty/load reservoir is one of integrally and monolithically formed.

14. The unitized brake assembly of claim 1, wherein the empty/load device includes a plurality of ports mated with empty/load ports on the pipe bracket thereby connecting the empty/load device via the reservoir port on the pipe bracket and a second of the ports on the combined brake cylinder-empty/load reservoir.

15. A unitized brake assembly for operating the brakes on a rail vehicle, comprising:
    a pipe bracket including at least a brake cylinder port, a brake pipe port, a reservoir port, control valve ports, and empty/load ports;

a control valve mounted to the pipe bracket and having a plurality of ports mated with the control valve ports on the pipe bracket;

a brake cylinder mounted to the pipe bracket and having a port mated with the brake cylinder port on the pipe bracket;

an empty/load reservoir having an empty/load reservoir port mounted to the pipe bracket and having a port mated with the reservoir port on the pipe bracket; and an empty/load device mounted to the pipe bracket and having a plurality of ports mated with the empty/load ports on the pipe bracket.

16. The unitized brake assembly of claim 15, wherein the empty/load device is mounted directly, without piping, on an end surface of the pipe bracket via sealable ports on the pipe bracket thereby providing a fluid connection of the empty-load device to the brake cylinder, empty/load reservoir, and the control valve.

17. The unitized brake assembly of claim 15, wherein the brake cylinder and empty/load reservoir are combined forming an integral combination mounted to the pipe bracket and the integral combination includes at least one mounting flange configured to mount the unitized brake assembly to the rail vehicle.

18. The unitized brake assembly of claim 15, wherein:
the pipe bracket, control valve, brake cylinder, empty/load reservoir and empty/load device are packaged as an integrated unit including direct mounting, without piping, via sealable fluid connections connecting the brake cylinder, the empty/load reservoir, the control valve, and the empty-load device to the pipe bracket.

19. The unitized brake assembly of claim 17, wherein the at least one mounting flange is the only mounting connection of the unitized brake assembly to the rail vehicle.

20. The unitized brake assembly of claim 19, wherein the at least one mounting flange includes two mounting flanges, each mounting flange formed on an opposite longitudinal side of the combined brake cylinder-empty/load reservoir, and the mounted pipe bracket overlies at least a portion of one of the mounting flanges.

* * * * *